United States Patent
Le Toquin et al.

(10) Patent No.: US 10,631,240 B2
(45) Date of Patent: Apr. 21, 2020

(54) METHOD FOR DELEGATING INSTRUCTIONS TO A DEVICE DEPENDING ON ITS RESOURCES

(71) Applicant: ORANGE, Paris (FR)

(72) Inventors: Christophe Le Toquin, Chatillon (FR); Joel Penhoat, Chatillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/349,273

(22) PCT Filed: Nov. 13, 2017

(86) PCT No.: PCT/FR2017/053089
§ 371 (c)(1),
(2) Date: May 12, 2019

(87) PCT Pub. No.: WO2018/091810
PCT Pub. Date: May 24, 2018

(65) Prior Publication Data
US 2019/0268837 A1     Aug. 29, 2019

(30) Foreign Application Priority Data
Nov. 16, 2016   (FR) .................................... 16 61099

(51) Int. Cl.
*H04W 48/18*     (2009.01)
*H04W 76/14*     (2018.01)
(Continued)

(52) U.S. Cl.
CPC ........... *H04W 48/18* (2013.01); *H04W 48/20* (2013.01); *H04W 76/14* (2018.02); *H04W 88/04* (2013.01); *H04W 88/18* (2013.01)

(58) Field of Classification Search
CPC ..... H04W 76/14; H04W 48/20; H04W 88/04; H04W 88/18
(Continued)

(56) References Cited

U.S. PATENT DOCUMENTS 10,021,541 B2 *   7/2018   Joseph .................... H04W 4/14
2013/0029675 A1   1/2013   Kwon et al.
(Continued)

FOREIGN PATENT DOCUMENTS

WO        2015167504 A1    11/2015

OTHER PUBLICATIONS

The Written Opinion and International Search Report from International Application No. PCT/FR2107/053089.

*Primary Examiner* — Congvan Tran
(74) *Attorney, Agent, or Firm* — Haverstock & Owens LLP (57) ABSTRACT

Method for selecting a device among a plurality of devices that are independent powerwise and that are connected to a network for accessing a communication network and that are located in a set geographic zone, said devices being able to execute instructions relating to the delivery of a service by the network, the method being implemented by a piece of managing equipment. The method comprises steps of obtaining a piece of information relating to capacities of devices of the plurality, of receiving a request message originating from a terminal that is connected to the communication network, said message comprising a request for resources for executing said instructions, of selecting at least one device from the plurality depending on the information and on the request for resources and of transmitting a selection message to the terminal, said message comprising an identifier of at least one selected device.

15 Claims, 4 Drawing Sheets

(51) Int. Cl.
    *H04W 48/20*    (2009.01)
    *H04W 88/04*    (2009.01)
    *H04W 88/18*    (2009.01)

(58) Field of Classification Search
    USPC .................................................... 455/414.1
    See application file for complete search history.

(56) References Cited

U.S. PATENT DOCUMENTS

| | | | |
|---|---|---|---|
| 2013/0331096 A1* | 12/2013 | Rogan | H04W 8/12 455/433 |
| 2014/0355519 A1 | 12/2014 | Li et al. | |
| 2015/0319581 A1* | 11/2015 | Dicke | G01C 21/362 455/457 |
| 2016/0042333 A1* | 2/2016 | Ho | G06Q 20/18 705/41 |

* cited by examiner

METHOD FOR DELEGATING INSTRUCTIONS TO A DEVICE DEPENDING ON ITS RESOURCES

FIELD OF THE INVENTION

The invention lies in the field of the architectures of access networks and of energy-constrained networks.

PRIOR ART

The services offered by operators to their clients rely on networks constructed and administered by the operators and on the basis of equipment and software implemented in a specific manner for the provision of these services as a whole. This observation also holds true with the deployment of so-called virtualized architectures. These virtualized architectures are in particular based in particular on the standardization works around the convergence of the techniques used in telecommunications networks on the one hand and the techniques of the computing world on the other hand and are discussed within the NFV (Network Function Virtualization) group of the ETSI (European Telecommunications Standards Institute). Until today, these virtualized architectures have been based on virtualized resources implemented by operators for example in data centers.

Moreover, the services offered by operators are becoming ever more numerous and ever more diverse. Indeed, both on fixed networks and on mobile networks, the services offered to residential and professional clients are becoming richer and are requiring more and more resources in terms of bandwidth, memory, data processing. The diversity of services is in particular due to the emergence of IoT (Internet Of Things) services characterized by specific data stream parameters, because they relate to a large number of terminals, but generally limited in terms of volume of data exchanged. These IoT services are also characterized by a large number and a fairly wide diversity of IoT equipment, including sensors, receivers, new communicating equipment related to electro-domestic appliances, to control devices, etc. . . .

This enhancement of the services offered to clients and their greater diversity require deployment of new resources for the operators for the flow of data streams related to these services. Furthermore, it should be noted that the new characteristics of the data streams may require significant resources for the operator at a particular site of the network or for a limited time, furthermore requiring greater flexibility in making available and distributing resources in order to ensure the provision of the services. For example, the organization of concerts or of sports competitions require resources around stadiums or halls for the time that the event lasts. Events occurring in a country may require resources over the whole or a part of the territory for a limited time.

In addition to the infrastructures that operators put in place to convey the data, the resources available at the periphery of the infrastructures of the networks may turn out to be particularly beneficial for various reasons. Periphery of the infrastructures should be understood to comprise the equipment connected to the fixed or mobile access networks of the operators. These resources comprise for example mobile terminals, equipment connected to the domestic or professional networks of the clients or even IoT equipment. They are generally not used permanently by clients and may be available to ensure functions other than their initial function and their position in the network periphery advantageously enables them to be used when capabilities are necessary in proximity to them.

But the resources available at the periphery of the infrastructures of the networks may be volatile, that is to say they may be present at a given instant and then disappear at another instant. To the volatility of some resources at the periphery of the infrastructures of the networks are added for some of them, i.e. the mobile resources, the characteristics of the devices for storing their energy. The dimensions of the storage devices do not allow storage of a large quantity of energy and the devices have finite reserves, which may dissipate, in particular between two recharges, when rechargeable batteries are involved. This aspect regarding energy, and more globally resources, must be taken into account if one device wishes to use another device to perform instructions.

The drawbacks related to the use of the volatile and mobile resources are the following:

A volatile resource may disappear even though it has been selected to process an enquiry. The quality of service is then not stable and may be impaired; the service quality experienced by the client using these resources, i.e. the Quality of Experience, is greatly impacted by this volatility.

The quantity of energy stored in the batteries of the mobile resources may dwindle while processing an enquiry. The Quality of Experience of the sender of the enquiry and the Quality of Experience of the receiver of the enquiry, i.e. the Quality of Experience of the one that consents to process the enquiry, may be impacted.

One of the aims of the invention is to remedy inadequacies/drawbacks of the prior art and/or to afford improvements thereto.

DISCLOSURE OF THE INVENTION

According to a first aspect, the invention relates to a method for selecting a device, from among a plurality of energy-autonomous devices connected to an access network of a communication network and situated in a determined geographical zone, which are able to execute instructions relating to the provision of a service by the network, the method being implemented by a management device comprising the following steps:

Obtaining of an information item relating to capabilities of devices of the plurality, Reception of an enquiry message originating from a terminal connected to the communication network, comprising a request for resources for the execution of said instructions, Selection of at least one device from among the plurality as a function of the information item and of the request for resources, Dispatching of a selection message to the terminal, comprising an identifier of the at least one selected device.

According to the prior art, the terminals can activate processes by using their own resources or call upon resources located in data centers or within local resources belonging to a residential or general-public client base. These various situations do not require the terminals to concern themselves with the energy capabilities of the resources upon which they call, either because they know this in the case where they use their own resources, or because the resources are fed with energy by energy suppliers.

The devices are energy-autonomous if they have their own resources such as accumulator batteries which can generally be recharged. When the devices are on a mode of operation using these accumulator batteries, particular attention to the energy available and to the energy consumption must be paid when invoking these devices for the execution of instructions.

The deployment of communications from terminal to terminal, and recourse to another device to implement processes that cannot be ensured by a terminal requires that the capabilities, in particular energy capabilities, of this other terminal be taken into account. The selection method makes it possible to consider the capabilities, in particular in terms of energy resources as well as in terms of consumption parameters related to the services and functions of the terminal, in order to determine a device to which to delegate instructions that a terminal wishes should be executed. The instructions may correspond for example to decoding functions, to stream transfer functions or else command functions. This method makes it necessary on the one hand to receive a request, sent by a terminal (mobile telephone, computer, sensor . . . ), for resources necessary for the implementation of the instructions and on the other hand to gather information items about the capabilities of the various devices that may be able to implement the instructions and finally to be able to select one of the devices as a function of these various information items collected. The method is implemented in a management device interacting with the terminal and the devices.

The devices which may be able to implement the instructions must be situated within direct communication range of the terminal. Stated otherwise, the terminal and the selected device must be able to communicate for example by using wireless communication of Wi-Fi or Bluetooth type or else by using a wire link for example of Ethernet type. Consequently, the management device called upon may manage a geographical zone in which it selects a device or else it may manage several zones, the choice of the geographical zone or of the zones within which it searches for a device possibly being specific to its mode of operation. The management device may define the search zone beforehand via network administration tools in particular.

If a device has the capability to implement the instruction, and if this device has been selected by the management device, the latter transmits the information item about the selected device to the terminal so that the latter can directly invoke the selected device in order to transfer the instructions to be accomplished to it or indicate them to it. The transfer between the terminal and the device or the invoking of the device by the terminal will be able to take place via a protocol of client-server type or a protocol used for M2M (Machine To Machine) services.

According to a particular characteristic, the information item relating to capabilities of devices comprises a data item relating to the quantity of energy available.

The quantity of energy available in the device is an important criterion for choosing the device selected to ensure the execution of the instructions. This quantity of energy is indeed indicative as regards both the duration of autonomy and also the capability to ensure certain instructions that are more or less energy-greedy.

In the case where the energy-autonomy is due to the use of accumulator batteries, the charge level of these batteries represents an important data item for selecting the device in charge of ensuring the implementation of an instruction of a terminal. This data item is usually available directly on the device in particular if it is a mobile telephone or indeed on a device of a domestic local network or company network. This data item can be represented in the form of a percentage of complete charge. The management device, on the basis of the various charge rates received, can select the device having the highest charge rate, on the one hand to provide the terminal with a guarantee of greater availability of the device and on the other hand, as a means of lessening the impact on a device having few available energy resources.

According to a particular characteristic, the information item relating to capabilities of devices comprises a data item relating to consumption parameters.

The devices have consumption parameters in respect of their own attributes. The attributes are for example the interfaces, the GPS (Global Positioning System) client, the brightness level of the screen, the activation or otherwise of the audio service. These attributes can vary as a function of the type of device, of the make, of the operating system, or indeed of the age of the device. The data item about the attributes which are active, that is to say which are actually in use at the moment the state message is dispatched, and which are non-active, liable to be invoked by a terminal, can advantageously be used by the management device to determine whether one device is liable to consume the resources of the accumulator battery more rapidly than another. This data item can for example be used as a supplement to the information item about the charge level of the battery in order to select a device by taking into account the fact that it discharges less rapidly than another having an equivalent or indeed higher charge level.

According to a particular characteristic, the request for resources includes parameters defining a communication service.

The determination of a device by the management device depends on the information collected about the devices but also on the level of resources as well as the type of resources related to the communication service to be activated. The communication service to be implemented on a device may require an audio service alone, in the case for example of a telephone connection service, or else an audio and video service, in the case for example of a streaming service. These communication services do not have the same energy consumption profile and more significant resources are necessary for the streaming service than for the audio service.

According to a particular characteristic, the enquiry message further comprises an information item relating to the location of the terminal.

The selection method being valid for a predefined geographical domain, the information item transmitted by the terminal about its own location is advantageously taken into account for the determination of the devices. For example if this location information item is represented by GPS coordinates, or indeed by information related to the IP addressing of the terminal, the management device is able to consider only devices situated in a defined domain with respect to the location of the terminal.

According to a particular characteristic, at least two devices are selected to execute the instructions.

A single device might not be able to implement the whole set of instructions that are requested by a terminal and for which a management device is invoked. In the case where it is possible to distribute the instructions over at least two devices, the management device, on the basis of the information item and of the request for resources received, can select two or more than two devices and inform the terminal thereof, the latter thereafter invoking the devices indicated so that they execute the instructions. The information item transmitted by the management device to the terminal to indicate to it the selected devices can also indicate the respective instructions which each selected device is to be made to execute or it can let the terminal decide instructions which the respective devices are to be made to execute.

According to a particular characteristic, the selection method further comprises a step of obtaining an information item relating to the location of the devices of the plurality.

The terminal communicates with the device once the latter has been determined by the management device. This communication is possibly established at the data link level, also identified as level 2 in the OSI (Open Systems Interconnection) architecture, in particular because the device and the terminal are geographically close. The information item about the location of the device may turn out to be relevant in the determination procedure carried out by the management device since it can be exploited to select a device situated in proximity, in particular if the management device is aware of the location of the terminal wishing to have a device execute instructions. This information item can correspond to GPS (Global Positioning System) location data, data related to an attachment to an access network, an IP (Internet Protocol) address.

According to a particular characteristic, the method further comprises a step of receiving a message comprising an information item relating to active interfaces of the devices of the plurality.

Knowing that the communications between the terminal and the at least one selected device are probably established via Wi-Fi and Bluetooth interfaces and in an ad-hoc manner, that is to say without necessarily involving a communications network operator, the information item about the active interfaces of the devices can be advantageously used. Indeed, the management entity can by priority choose the devices having an active interface allowing more significant bitrates or making it possible to guarantee a minimum loss of packets. Each device can thus transmit to the management entity the active network interfaces, such as for example the Wi-Fi, Bluetooth, 6lowpan (IPv6 Low Power Wireless Personal Area Networks) interfaces, in such a way that the management entity integrates this information item into its criteria for selecting a device.

According to a particular characteristic, the selection message further comprises an information item relating to a connectivity of the selected device.

The terminal, on receiving the selection message, contacts the device so that it executes the instructions which are submitted to it. The terminal, in order to be able to communicate directly with the device, must possess an information item allowing it to reach it. In the case where the terminal does not have this information item at its disposal, the management device can dispatch to it an information item such as the IP address, an MAC (Medium Access Control) address or else an information item of FQDN (Fully Qualified Domain Name) type.

According to a second aspect, the method also relates to a management device, implementing the method for selecting an energy-autonomous device, from among a plurality of devices connected to an access network of a communication network and situated in a determined geographical zone, with the aim of executing instructions relating to the provision of a service by the network comprising:

A module for obtaining an information item relating to capabilities of devices of the plurality,     A receiver designed to receive an enquiry message comprising a request for resources for the execution of said instructions,     A selection module designed to select at least one device from among the plurality as a function of the information item and of the request for resources,     A sender designed to send a selection message to the terminal, comprising an identifier of the selected device,     A database designed to save the information item.

According to a particular characteristic, the receiver of the management device is also designed to receive an information item relating to the location of the devices of the plurality.

According to a third aspect, the invention also relates to a terminal connected to a communications network, comprising:

a sender designed to send an enquiry message comprising a request for resources for the execution of instructions relating to the provision of a service by the network,     a receiver designed to receive a selection message, comprising an identifier of at least one selected device able to execute said instructions.

According to a fourth aspect, the method also relates to a system for selecting at least one energy-autonomous device, from among a plurality of devices connected to an access network of a communication network and situated in a determined geographical zone, comprising:

A management device such as has just been described,

A terminal such as has just been described.

According to a fifth aspect, the method also relates to a selection program, characterized in that it comprises the instructions for the implementation of the steps of the selection method as claimed in claim 1, when said program is executed by a processor and a recording medium readable by a control device on which the program is recorded.

The program can use any programming language, and be in the form of source code, object code, or of code intermediate between source code and object code, such as in a partially compiled form, or in any other desirable form.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can be in particular downloaded over a network of Internet type.

Alternatively, the information medium can be an integrated circuit in which the program is incorporated, the circuit being adapted to execute or to be used in the execution of the method in question.

4. DETAILED DESCRIPTION OF AT LEAST ONE EMBODIMENT OF THE INVENTION

Other characteristics and advantages of the invention will become apparent on reading in the description detailed hereinafter particular embodiments given by way of non-limiting examples, and the appended figures in which.

DETAILED DESCRIPTION OF AT LEAST ONE EMBODIMENT OF THE INVENTION

In the subsequent description, will be described an embodiment of the method for selecting a device, from among a plurality of energy-autonomous devices according to the invention.

Figure 1:
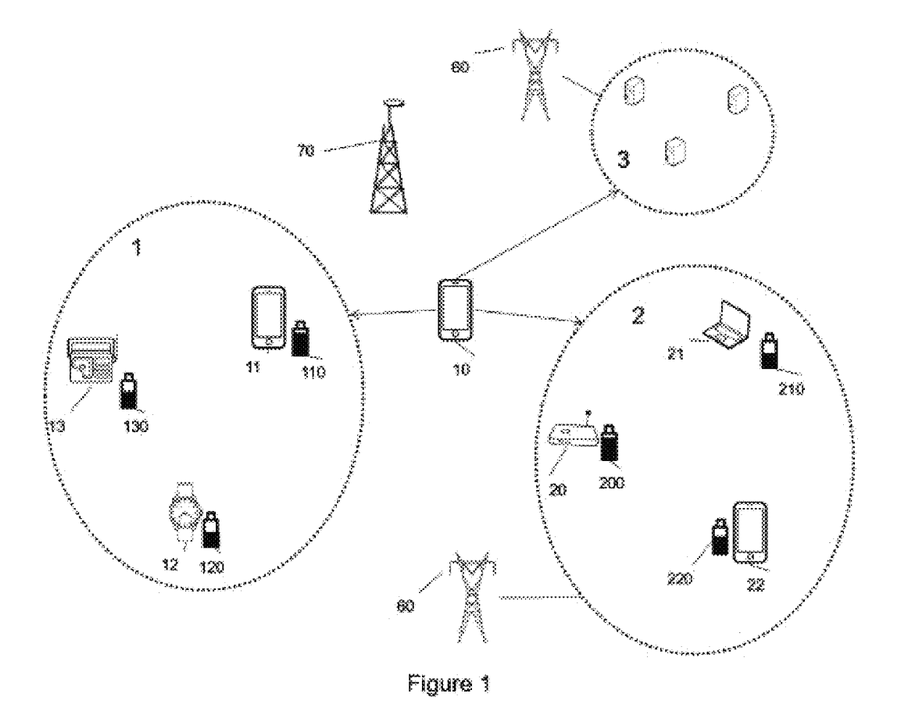
FIG. 1 presents in a schematic manner a communication network architecture and the energy sources of the equipment, according to the prior art.

Reference is made firstly to FIG. 1 which presents in a schematic manner, according to the prior art, a communication network architecture and the energy sources of the equipment. The terminal 10 is connected to an access network 70 of cellular type, for example based on the 3GPP (3rd Generation Partnership Project) standard of second, third or fourth generation or of a subsequent generation. The terminal 10 can be a mobile telephone or any other device able to connect to an access network (laptop computer, sensor, watch . . . ) and the access network can also be based on IEEE (Institute of Electrical and Electronics Engineers) or 3GPP2 (3rd Generation Partnership Project 2) standards or any other standard making it possible to implement access networks.

In the case where the terminal 10 wishes instructions to be executed related to the processing of the data, to the modification of the data, to the sending or the receiving of data, it has the possibility of invoking various types of equipment. It can invoke equipment centralized in a data center 3. The data center being centralized, therefore probably distant from the terminal 10, the latter in this case uses its connection to the access network 70 or to another access network if it is also connected for example by Wi-Fi to a public access point. In this case, the resources of the data center are distant and require the terminal 10 to have a connection to an access network but the constraints in respect of availability and of lack of energy resources do not arise. These data centers are indeed fed with energy by an electricity supplier which, furthermore, ensures an all the more significant availability of energy when dealing with a data nerve center, that is to say which must be permanently operational.

The terminal 10 also has the possibility of invoking a network 2 in proximity to its geographical situation, such as a professional or residential local network. These networks generally allow an "invited" terminal to connect to the network in particular if the terminal 10 and the local network 2 are clients of one and the same service provider or of service providers having an agreement between them. The terminal 10 can thus access the local network 2, and use resources of this network, by connecting to a Wi-Fi network broadcasted by an access device of the local network, if necessary by using a security key, but without necessarily being a client of the same provider. Just as for the case of the centralized data center, the problem of energy resources do not arise on condition that the device of the local network whose terminal 10 uses the resources is not energy-autonomous. In FIG. 1, the local network 2 is fed by the electrical network 60 but the devices 20, 21, 22 of the local network 2 may also in certain cases be energy-autonomous, if they are disconnected from the electrical network 60 or if the electrical network is not operational and does not feed the local network 2 with electricity. The criticality due to the lack of resources of the devices 20, 21, 22 of the local network 2 is very real, as a function in particular of the charge of the respective accumulator batteries 200, 210, 220, called batteries hereinafter in the text, of the devices 20, 21, 22.

The terminal 10 can also invoke devices 11, 12, 13 of the geographical zone 1. With respect to the previous two options, the devices 11, 12, 13 present in the zone 1 do not necessarily have any connections with one another but share the characteristic of lying in a zone situated in proximity to the terminal 10. This allows the latter to communicate with the devices 11, 12, 13 without requiring a connection to the access network 70. These devices 11, 12, 13 are connected to an access network of a communication network, which may be different from the access network 70, and they may be invoked by the terminal 10 since they lie in a geographical zone making it possible to guarantee a sufficiently satisfactory quality of service. The terminal can communicate with one of these devices, if it uses resources of one of these devices, by using a direct connection, for example based on an M2M (Machine to Machine) protocol, not necessarily requiring any operator infrastructure. When the terminal 10 invokes one of the devices 11, 12, 13 to perform instructions, the resources, in particular the energy resources, at the disposal of these devices in order to satisfy the needs of the terminal 10 are particularly important to consider in the procedure for choosing the device.

Figure 2:
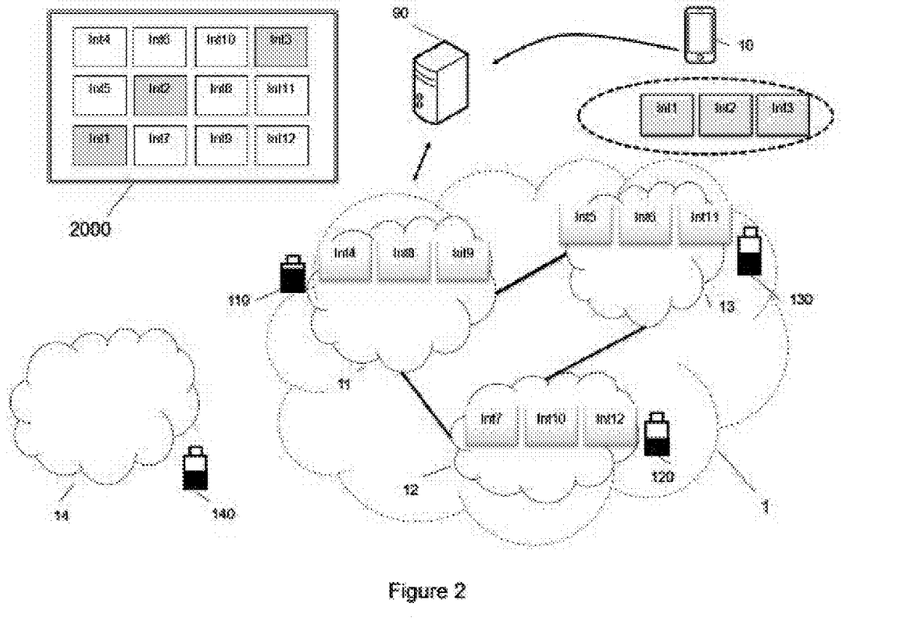
FIG. 2 presents a logical view of an architecture in which a method for selecting a device is implemented according to one aspect of the invention.

Reference is now made to FIG. 2 which presents a logical view of an architecture in which a method for selecting a device is implemented according to one aspect of the invention. In this figure, is represented a terminal 10 which wishes to have a set of instructions Int1, Int2, Int3 be executed at devices of the network. Four devices are represented in the figure to execute these instructions. Three devices 11, 12, 13 form part of a geographical zone 1 within which the instructions can potentially be executed by devices. The device 14 does not form part of the zone 1 and may not therefore be selected. The geographical zone, within which the devices can actually be selected, is defined initially by the entity 90 in charge of selection or else by another entity which communicates this zone to the entity 90. Tools measuring the quality of service of the various devices can advantageously be used to integrate or otherwise these devices into a zone corresponding to a required level of quality of service. Another embodiment can consist in relying on the geographical coordinates, for example arising from GPS data, to define the geographical zone. The management entity 90 selects the device or devices ensuring the execution of the instructions Int1, Int2, Int3 from among the devices 11, 12, 12 having respectively accumulator batteries 110, 120, 130 whose charge level is represented by the height of the black rectangle. The terminal 10 invokes the management entity 90 to have the instructions Int1, Int2, Int3 be executed by devices. The terminal knows the management entity subsequent to a manual or automatic configuration, for example via a communication with an administration entity. It can also obtain the information item about the management entity 90 via a configuration protocol of DHCP (Dynamic Host configuration Protocol) or SNMP (Simple Network Management Protocol) type. The management entity 90 has at its disposal a database 2000 in which it records in particular the requests for executions of instructions of the terminals. In FIG. 2, the database comprises the instructions Int4, Int5, Int6, . . . , Int12 which are instructions to be executed requested by the terminal 10 or by other terminals that have invoked the management entity 90. To these instructions are therefore added the instructions Int1, Int2, Int3 which one or more devices of the zone 1 are to be made to execute. The management entity 90 can keep a database per geographical zone or else a database for the whole set of geographical zones that it manages. In the case of a single base, the management entity 90 has a means of indexing the instructions per managed zone. In FIG. 2, it is considered that the database 2000 corresponds to the geographical zone 1. The instructions Int4, Int8, Int9 are executed by the device 11, the instructions Int5, Int6, Int11 are executed by the device 13 and the instructions Int7, Int10, Int12 are executed by the device 12. The management entity must, if possible, have the instructions Int1, Int2, Int3 be executed by one of these three devices belonging to the zone 1. The number of devices per zone is not a priori limited, and according to the parameter retained for the definition of the zone, new devices can be integrated into the geographical zone. Devices can also leave it. The management entity 90 can be specifically deployed to implement the selection method. In this case, it carries out only this function. The selection method can also implemented in an entity ensuring other functions. For example, this may entail an administration entity of the networks. This function can also be instantiated in the form of a virtualized function, that is to say in software form deployed on a hardware device non specific to the function carried out, here the selection method.

Figure 3:
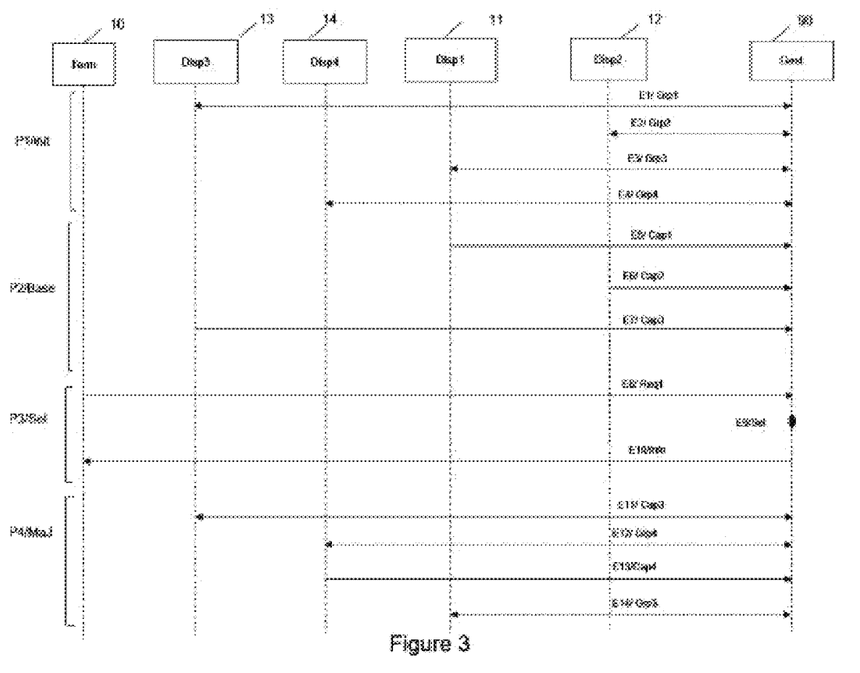
FIG. 3 describes an exemplary implementation of the various steps of the method for selecting a device according to one embodiment of the invention.

Reference is now made to FIG. 3 which presents the various steps of the method for selecting a device according to one embodiment of the invention. The selection process is structured into 4 phases. A first phase P1 comprising steps E1 to E4 which is an initialization phase corresponding to the construction of the geographical domain. The second phase P2 comprising steps E5 to E7 in the course of which the management entity 90 constructs its database. The third phase P3, which comprises steps E8 to E10, is the phase in the course of which the actual selection of one or more devices is performed. Phase P4, comprising steps E11 to E14, is a phase of updating the information items useful to the selection method.

During phase P1, the various devices 11, 12, 13, 14 dispatch to the management entity 90 an information item enabling the latter to define a geographical zone within which it selects devices. During this phase P1, the initialization process Init is carried out on the basis of exchanges between each device and the management entity. The device 13 communicates a message Grp1 during step E1. This message can consist in dispatching GPS coordinates, in dispatching information items in respect of quality of service or else of indicating connectivity parameters such as an IP (Internet Protocol) address to the management device 90. Another embodiment can consist in the management entity 90 invoking the various devices for example to ascertain their quality of service. It can use a specific tool to grade the devices in terms of quality of service or else for example dispatch a message of ICMP (Internet Control Message Protocol) type to the various devices. The devices can be aware of the management entity by manual or automatic configuration, or else by having obtained the information item about this management entity during their configuration via the DHCP or SNMP protocol for example. In the case where the management entity 90 invokes the devices, it can invoke the devices situated in a broadcast or multicast domain, for example by using a multicast address specific to this discovery. The management entity 90 communicates with each device 11, 12, 13, 14 in the respective steps E1, E2, E3, E4 where, on the basis of the messages Grp1, Grp2, Grp3, Grp4, the management entity constructs the geographical zone within which it selects one or more devices to execute instructions requested by a terminal. During this first phase P1, the management entity 90 retains 3 devices 11, 12, 13 in the geographical selection zone. The device 14 is not retained since it is too distant or because it does not exhibit a sufficient quality of service to be integrated into the geographical zone, according to the mode retained for belonging to the zone.

During phase P2, each device of the zone advises of its capabilities by dispatching an information message to the management entity 90. According to a particular embodiment, the devices can transmit to the management entity a data item about the quantity of energy available, corresponding for example to a charge level of the batteries. Each device indicates its charge level to the management entity. In another embodiment, the devices transmit data about the devices' consumption parameters. Indeed, the charge level of the battery may be a data item that is beneficial but not sufficient for the management entity 90 to make the best choice. A first device may have a better charge than a second device but, for all that, it may be more beneficial to select the second device since it has better consumption parameters. The devices, in this embodiment, provide for example the consumption parameters related to the present state of the devices. If on the device 11, GPS is activated, the brightness level is "y", Wi-Fi is activated, and the audio system is activated, it transmits in the course of step E5 the consumption characteristics related to GPS, to Wi-Fi, to the audio system and to the brightness level "y" as well as the consumption parameter of the CPU (Central Processing Unit). Another device, 12 transmits in the course of step E6 the parameters related to the activation of its GPS, of its video system, of its video system and of its CPU consumption in the case where only these services are activated. The battery charge level and the consumption parameters can also be transmitted jointly to the management entity 90. Each device 11, 12, 13 of the geographical zone transmits an information item relating to its capabilities in the respective messages Cap1, Cap2, Cap3 transmitted during steps E5, E6, E7. When the parameters evolve, for example if a service is activated or deactivated on the device, or at regular time intervals if dealing with charge level, the devices 11, 12, 13 can send new messages to indicate to the management entity 90, the new information items to be taken into account.

The selection phase proper, P3, is initiated thereafter. This phase P3 is liable to occur at any moment, since it is initiated when a terminal, which may be a mobile terminal, a computer, a network device, wishes instructions to be executed by a device of the network. This explains why the management entity must keep up-to-date information about the geographical zones and about the capabilities of the devices, in accordance with the steps of phases P1 and P2 described previously. If phase P3 occurs whilst the management entity does not possess all the information about the devices enabling it to select a device, it can trigger one of the two or both phases P1 and P2. This may arise in particular during a restart of the management entity 90 after an untimely interruption, which did not allow the database to be saved. In order to avoid this type of problem, an embodiment based on at least two management entities, which are for example deployed in cluster mode, sharing the same information and guaranteeing high availability is recommended.

The starting of phase P3 occurs when the terminal 10 sends, during step E8, an enquiry to the management entity 90 to have instructions be executed. This request consists in the terminal 10 asking the management entity 90 for resources for the provision of a service by the network possibly consisting in a processing service (coding, decoding, application of a specific processing policy . . . ), in a transmission service for example for dispatching to a server in particular or a combination of processing services and transmission services. Any other service requiring resources is considered to be able to benefit from the selection service. In one embodiment, the resources request sent by the terminal 10 may relate to a communication service and comprise data making it possible to enrich the selection method. In particular, if the request for resources relates to a video service, the terminal 10 will be able to indicate in the enquiry that a video service is involved or else indicate in the enquiry that the service is composed of a "video" function and of an "audio" function. The enquiry message can further comprise an information item about the geographical location of the terminal 10 enabling if relevant the management entity 90 to choose the geographical zone in which the device is selected. This information item can be in the form of a geographical location data item, for example GPS coordinates, or else in the form of a topological location data item, indicating for example an IP address or an attachment network.

On receiving such an enquiry from the terminal 10, the management entity 90 undertakes the selection of a device that can actually ensure the execution of the instructions. Accordingly, during step E9, it analyses the resources request sent by the terminal 10 while taking account, if there is any, of the complementary information relating to the communication service and/or the location of the terminal 10, and searches among the devices that it has considered in the geographical zone, and as a function of their capabilities, for the device which is the most appropriate for the needs. It may happen that no device meets the need in which case it will advise the terminal 10 thereof. Another option consists in indicating to the terminal 10 at least two devices that can split the load of executing the instructions. The management entity 90, in particular if it has information about the communication service for which the execution of instructions is requested, may decide not to indicate more than one device to the terminal 10 since it has determined that it is not possible to distribute the instructions over two devices. In the case where it is not capable of knowing whether or not this is possible, it may decide to return the information item about the two devices to the terminal, which will thereafter decide to invoke the two devices or not. Thereafter, the management entity 90 indicates to the terminal the selected device or devices if it has chosen any.

During step E10, the management entity 90 indicates in an info message the selected device(s). In one embodiment, this message may integrate a connectivity information item allowing the terminal to reach the selected device. The "Info" message can contain an information item about a single device, about several devices or about none in the unfavorable case where no device has the necessary resources at its disposal. Once the terminal 10 knows the selected device or devices, it is able to invoke the device(s) directly so as to make it or them execute the instructions. The terminal 10 can communicate with the selected device by using the connectivity information item transmitted by the management entity 90 during step E10. In the case where the connectivity information item is not present, it then uses means making it possible to translate the information item received on the device into a connectivity information item for example by calling upon a service for resolving names, for example based on a DNS (Domain Name Server) or of a service for automatic discovery of services, for example based on the SLP (service Location Protocol) protocol.

The updating phase P4 is a phase which can occur at any moment of the method and integrates steps of updating, either the geographical zone, or the capabilities of the devices. The device 13 indicates for example a change of capability to the management entity 90 during step E11, subsequent for example to a recharging of the battery. The device 14, during step E12, dispatches new data related to the geographical zone, for example subsequent to its displacement, and is added to the devices of the zone by the management entity 90. The device 14, henceforth forming part of the geographical zone, transmits its capabilities during step E13 to the management entity 90. The device 11 dispatches new capabilities, for example to indicate that its battery is very discharged, to the management entity 90 during step E14.

Figure 4:
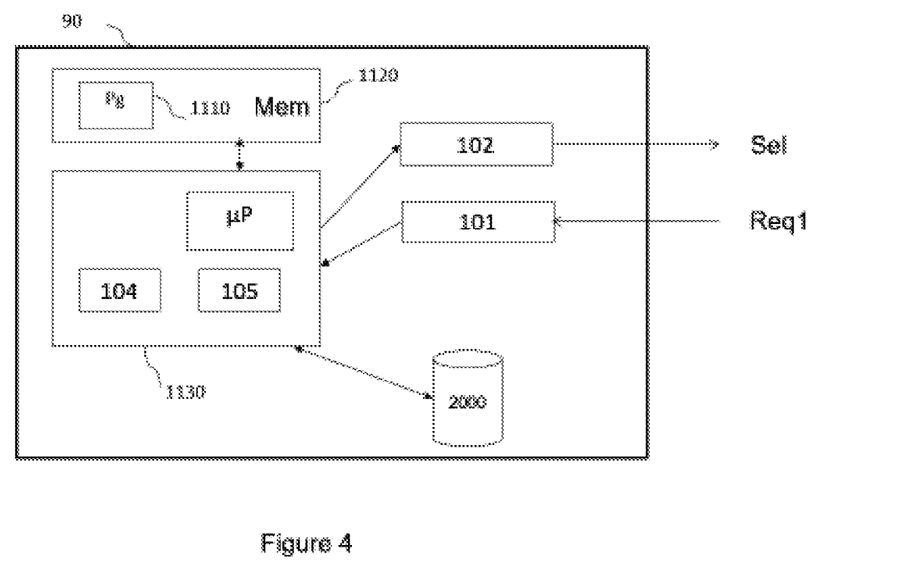
FIG. 4 represents an exemplary structure of a management entity able to implement the selection method according to the invention.

Reference is now made to FIG. 4 which represents a structure of a selection device able to implement the selection method according to one aspect of the invention.

For example, the device 10 comprises a processing unit 130, equipped for example with a microprocessor μP, and driven by a computer program 110, stored in a memory 120 and implementing the selection method according to the invention. On initialization, the code instructions of the computer program 110 are for example loaded into a RAM memory, before being executed by the processor of the processing unit 130.

Such a device 10 comprises the following modules:

- A module 105 for obtaining an information item relating to capabilities of devices of the plurality,
- A receiver 101 designed to receive an enquiry message Req1 comprising a request for resources for the provision of a service by the network,
- A selection module 104 designed to select a device from among the plurality as a function of the information item and of the request for resources,
- A sender 102 designed to send selection message Sel to the terminal, comprising an identifier of the selected device,
- A database 2000 designed to record the requests for executions of instructions of the terminals.

Optionally, in another embodiment, the receiver 101 is also designed to receive an information item relating to the location of the devices.

The modules described in conjunction with FIG. 4 can be hardware modules or software modules.

The invention is not limited to the exemplary embodiments hereinabove described and represented, on the basis of which it will be possible to envisage other modes and other forms of embodiment, without however departing from the scope of the invention.

The selection method is in particular also suitable for an environment where the resources are virtualized and the instructions are to be executed on virtualized instances, themselves implemented on physical devices whose resources are limited. According to the embodiment, the information items transmitted by the devices may be global, that is to say related to the hardware environment, but they may also be more specific and related for example to a virtualized function. Thus, the devices may indicate that resources initially related to certain virtualized functions may however be assigned to instructions requested by a terminal. It may also indicate that a virtualized function may not be interrupted and therefore reserve the appropriate resources so that this function is not interrupted and used by a terminal.

The selection method makes it possible to select resources in order to execute instructions but also to better manage the energy resources and contrive matters so that the available resources are better used. Indeed, by selecting devices having resources available to execute instructions, recourse to exterior resources is avoided, the ultimate effect of which is to better utilize resources within the geographical zone. The selection method can therefore in certain modes of deployment be regarded as a process for optimizing the capabilities in a geographical zone.

The invention claimed is:

1. A method for selecting a device, from among a plurality of energy-autonomous devices (11, 12, 13) connected to an access network of a communication network and situated in a determined geographical zone (1), which are able to execute instructions (Int1, Int2, Int3) relating to the provision of a service by the network, the method being implemented by a management device (90) comprising:
- obtaining of an information item relating to capabilities of devices (11, 12, 13) of the plurality, said capabilities relating to energy resources,
- receiving of an enquiry message originating from a terminal (10) connected to the communication network, comprising a request for resources for the execution of said instructions (Int1, Int2, Int3),
- selecting of at least one device from among the plurality as a function of the information item and of the request for resources, and
- dispatching of a selection message to the terminal (10), comprising an identifier of the at least one selected device.

2. The selection method as claimed in claim 1 where the information item relating to capabilities of devices (11, 12, 13) comprises a data item relating to the quantity of energy available.

3. The selection method as claimed in claim 1 where the information item relating to capabilities of devices (11, 12, 13) comprises a data item relating to consumption parameters.

4. The selection method as claimed in claim 1 where the request for resources includes parameters defining a communication service.

5. The selection method as claimed in claim 1 where the enquiry message further comprises an information item relating to the location of the terminal.

6. The selection method as claimed in claim 1 where at least two devices are selected to execute the instructions.

7. The selection method as claimed in claim 1 further comprising obtaining an information item relating to the location of the devices of the plurality.

8. The distribution method as claimed in claim 1 further comprising receiving a message comprising an information item relating to active interfaces of the devices of the plurality.

9. The selection method as claimed in claim 1 where the selection message further comprises an information item relating to a connectivity of the selected device.

10. A management device, for selecting an energy-autonomous device, from among a plurality of devices connected to an access network of a communication network and situated in a determined geographical zone, with the aim of executing instructions relating to the provision of a service by the network comprising:
- a module for obtaining an information item relating to capabilities of devices of the plurality, said capabilities relating to energy resources,
- a receiver designed to receive an enquiry message comprising a request for resources for the execution of said instructions,
- a selection module designed to select at least one device from among the plurality as a function of the information item and of the request for resources,
- a sender designed to send selection message to the terminal, comprising an identifier of the selected device, and
- a database designed to save the information item.

11. The management device, as claimed in claim 10, where the receiver is also designed to receive an information item relating to the location of the devices of the plurality.

12. A terminal connected to a communications network, comprising:
- a module for obtaining an information item relating to capabilities of devices, said capabilities relating to energy resources,
- a sender designed to send an enquiry message comprising a request for resources for the execution of instructions relating to the provision of a service by the network, and
- a receiver designed to receive a selection message, comprising an identifier of at least one selected device able to execute said instructions.

13. A system for selecting at least one energy-autonomous device, from among a plurality of devices connected to an access network of a communication network and situated in a determined geographical zone, comprising:
- a management device for selecting an energy-autonomous device, from among a plurality of devices connected to an access network of a communication network and situated in a determined geographical zone, with the aim of executing instructions relating to the provision of a service by the network comprising:
  - a module for obtaining an information item relating to capabilities of devices of the plurality, said capabilities relating to energy resources,
  - a first receiver designed to receive an enquiry message comprising a request for resources for the execution of said instructions,
  - a selection module designed to select at least one device from among the plurality as a function of the information item and of the request for resources,
  - a first sender designed to send a selection message to a terminal, comprising an identifier of the selected device, and
  - a database designed to save the information item; and
- the terminal connected to the communications network, comprising:
  - a second sender designed to send the enquiry message comprising a request for resources for the execution of instructions relating to the provision of a service by the network, and
  - a second receiver designed to receive the selection message, comprising an identifier of at least one selected device able to execute said instructions.

14. A selection program comprising instructions for implementation of a selection method when said program is executed by a processor, the selection method for selecting a device, from among a plurality of energy-autonomous devices connected to an access network of a communication network and situated in a determined geographical zone, which are able to execute instructions relating to the provision of a service by the network, the selection method being implemented by a management device comprising:

obtaining of an information item relating to capabilities of devices of the plurality, said capabilities relating to energy resources, receiving of an enquiry message originating from a terminal (10) connected to the communication network, comprising a request for resources for the execution of said instructions, selecting of at least one device from among the plurality as a function of the information item and of the request for resources, and dispatching of a selection message to the terminal (10), comprising an identifier of the at least one selected device.

15. A recording medium readable by a control device on which is recorded a selection program comprising instructions for implementation of a selection method when said program is executed by a processor, the selection method for selecting a device, from among a plurality of energy-autonomous devices connected to an access network of a communication network and situated in a determined geographical zone, which are able to execute instructions relating to the provision of a service by the network, the selection method being implemented by a management device comprising:

obtaining of an information item relating to capabilities of devices of the plurality, said capabilities relating to energy resources, receiving of an enquiry message originating from a terminal (10) connected to the communication network, comprising a request for resources for the execution of said instructions, selecting of at least one device from among the plurality as a function of the information item and of the request for resources, and dispatching of a selection message to the terminal (10), comprising an identifier of the at least one selected device.

\* \* \* \* \*